Patented Apr. 29, 1947

2,419,880

UNITED STATES PATENT OFFICE 2,419,880

POLYVINYL RESIN ADHESIVE COMPOSITION, PLYWOOD, AND METHOD OF MAKING PLYWOOD

Lee L. Blyler, Spotswood, John W. Clough, Parlin, Charles W. Hawley, New Brunswick, and Earle C. Pitman, Red Bank, N. J., assignors to E. I. du Pont de Nemours & Company, Wilmington, Del., a corporation of Delaware No Drawing. Application July 10, 1943, Serial No. 494,266

13 Claims. (Cl. 20—89)

This invention relates to an improved adhesive composition and more particularly to laminated cellulosic structures such as plywood in which the improved adhesive compositions are used as the bonding medium.

Numerous types of adhesives have been employed for the manufacture of plywood with varying degrees of success. Some of the presently available adhesive compositions have been deficient in providing satisfactory joint strength, frequently permitting delamination at the "glue line," a type of failure that cannot be tolerated for many utilities where high joint strength is an essential requirement. Other types of adhesives when used for manufacturing plywood are deficient in flexibility and because of their brittle nature are likewise limited in their utility. Some commercial adhesives are subject to "plastic flow" at normally encountered temperatures, a property that is likewise prohibitive for many purposes. Poor outdoor durability and resistance to water and organic liquids such as petroleum hydrocarbons constitute other deficiencies in some of the currently available adhesive compositions.

This invention has as an object the provision of an adhesive composition which affords high shear strength, both dry and after extended immersion in boiling water of plywood laminations bonded with the adhesive. Another object is the provision of an adhesive composition which does not exhibit "plastic flow" at normal or at elevated temperatures, thus eliminating slippage of plywood laminae when used for this purpose. Another object is the provision of an adhesive composition which reacts with cellulosic materials, thus affording a chemical association with the cellulose fibres in plywood laminations and eliminating "glue line" failures when such structures are under stress. Another object is the provision of an adhesive composition which is tough and highly flexible even at very low temperatures. Another object is the provision of an adhesive which is particularly suited for the manufacture of molded plywood. Another object is the provision of a process for manufacturing plywood in which the surface of the contiguous plies is chemically combined with the adhesive, thereby obtaining an exceptionally strong bond between the laminae. Another object is the provision of an adhesive composition which when applied to the surface of thin wood veneer such as used for plywood construction does not cause curling of the veneer plies. A further object is the provision of an adhesive which is resistant to organic liquids, particularly petroleum hydrocarbons. A still further object is the provision of an improved plywood structure. Other objects will appear as the description of the invention proceeds.

These objects are accomplished in accordance with the invention by means of a composition comprising a linear polyvinyl resin containing a plurality of carboxylic and alcoholic hydroxyl groups in which the number of carboxylic groups exceeds the number of hydroxyl groups, preferably dissolved or dispersed in a liquid volatile vehicle containing at least one solvent having an evaporation rate less than that of water and preferably less than that of butyl acetate. More specifically the linear polyvinyl resin can be prepared from a mixture of linear carboxylic acids and aliphatic linear polymeric alcohols. An example of the compositions of the invention is the interpolymer of styrene and maleic anhydride combined with a 50% hydrolyzed polyvinyl acetate having a viscosity characteristic between 400 and 8000 centipoises and dissolved or dispersed in a mixture of water, ethyl alcohol and diacetone alcohol or similar solvent vehicle containing volatile solvent having an evaporation rate less than that of water and preferably less than that of butyl acetate. The viscosity of the composition is between 1800 and 3600 centipoises.

The polymer or mixture of polymers, preferably a mixture of about 1.5 parts of a styrene-maleic anhydride interpolymer and about 1 part of a high molecular weight 50% hydrolyzed polyvinyl acetate is obtained in solution by refluxing with low molecular weight water-miscible solvents. This solution is then applied to at least one surface of the articles to be joined, preferably to a cellulosic surface, thus providing intimate contact with the polymeric substance. After evaporation of at least a portion of the volatile solvent vehicle the coated surfaces are placed in contiguous relationship, preferably under pressure and heated to a temperature of at least 120° C., thereby causing conversion of the resin polymer and in the case of cellulosic surfaces, a reaction with the cellulose and providing a strong bond between the surfaces.

The following examples are given by way of illustration only and no limitations are intended thereby except as indicated in the appended claims.

Example 1

|  | By weight |
|---|---|
| Styrene-maleic anhydride interpolymer | 11.7 |
| Polyvinyl acetate (50% hydrolyzed) | 8.5 |
| Denatured alcohol (23A) | 59.0 |
| Diacetone alcohol | 5.0 |
| Water | 15.8 |
|  | 100.0 |

The viscosity of the polyvinyl acetate in this example was about 5000 centipoises as determined in a 15% solution of the resin in a 4:1 ratio by weight mixture of 23A regular denatured alcohol and water.

The composition of the example was prepared by refluxing an interpolymer of equimolecular quantities of styrene and maleic anhydride and of such molecular weight that 100 ml. of a 12.1% aqueous solution of the sodium acid salt possessing a pH of 5.2 requires 80 to 170 seconds to drain from a Dudley viscosity pipette at 25° C. with the 23A denatured alcohol (ethyl alcohol denatured with 9% acetone by volume) until completely dissolved in the alcohol. The partially hydrolyzed polyvinyl acetate and the water were added to this solution and refluxing with agitation continued for 5 hours. A clear homogeneous solution having a pH in the range of 2.6–3.4 resulted. The diacetone alcohol was then added with further agitation. The final composition which had a final viscosity at 25° C. of about 2000 centipoises may then be filtered if desired through wire screen, felt or other means.

The adhesive was spread on each glue line surface of birch veneer with a brush in an amount sufficient to provide about 18 pounds of resin per 1000 square feet of glue line. Usually two coats applied by hand brush or with a mechanical glue spreader are satisfactory. A one hour drying time was allowed between coats and a 2 hour drying time permitted before assembly of the parts. Substantially no curling of the veneer was observed although specimens coated with a like adhesive but containing no diacetone alcohol or equivalent solvent as hereinafter defined, curled badly, thereby presenting serious difficulty in handling and proper assembly. The plies may be assembled and bonded as soon as the adhesive coating has reached the tack-free stage or this operation may be carried out after 15 days or even more storage time with acceptable results.

Three veneer strips were assembled in contiguous, cross-grain relationship, the center ply having been coated with the adhesive on both surfaces and the outer plies on the surface only next to the adjacent ply and the assembly bonded by a conventional bag process such as described in U. S. Patent 2,276,004 using an autoclave at a pressure of 40# gauge at a temperature of 135° C. for 12 minutes followed by an air squeeze at 70# gauge for 12 minutes.

Plywood specimens consisting of 3 plies with the center ply in cross-grain relation to the outer 2 plies were cut and tested for shear strength, both dry and after a 3 hour boil test in accordance with the procedure described in Army-Navy Aeronautical Specifications AN-NN-P-511b. The dry shear strength was 547 pounds per square inch with 90% wood failure and after the 3 hour boil test, the shear strength was 453 pounds per square inch with 53% wood failure, both results being well above the minimum requirements established in the Aeronautical Specifications of 380 pounds per square inch dry shear and 290 pounds per square inch shear strength after the 3 hour boil test.

Other specimens of the plywood were also subjected to further stringent testing consisting of a series of 10 cycles of alternate exposure to boiling water and to elevated temperatures, each cycle consisting of a 2 hour boil in water followed by a 22 hour bake at 65° C. The dry shear strength of the plywood at the end of this test was 420 pounds per square inch with 74% wood failure.

The high percentage wood failure is indicative and confirming of the conclusions drawn in co-pending application of Arnett & Smith, S. N. 494,240, July 10, 1943 that there is a chemical reaction between the adhesive and the cellulose and distinguishes in an important way from commercial phenolic and urea-formaldehyde resin plywood adhesives which show very low percentage wood failure indicating greater failure in the glue line, a very undesirable type of failure where high shear strengths under stringent conditions are required.

The wet and dry shear strengths are definitely superior to those of present commercial adhesives. The new adhesive also possesses greater fluidity for a much longer period during the early stages of conversion than do phenolic or urea resin adhesives so that molded plywood shapes can be produced by the rubber bag technique with greater facility using the compositions of the invention. However, the finished plywood is very resistant to plastic flow in the glue line even at elevated temperatures.

The unusual flexibility of the adhesive at low temperatures is shown by the ability of plywood structures bonded with the new adhesive to withstand flexing at −53° C. without cracking or delamination.

Example 2

|  | Per cent by weight |
|---|---|
| Styrene-maleic anhydride interpolymer (7% xylene) | 14.8 |
| Polyvinyl acetate (48% hydrolyzed) | 10.0 |
| Denatured alcohol (23A) | 55.2 |
| Diacetone alcohol | 5.0 |
| Water | 15.0 |
|  | 100.0 |

The viscosity of the polyvinyl acetate in this example was about 950 centipoises as determined in a 15% solution of the resin in a 4:1 ratio by weight mixture of 23A denatured alcohol and water.

This composition was prepared and applied to wood veneer and plywood specimens prepared in accordance with the procedure of Example 1.

Test specimens bonded with this adhesive gave a dry shear strength of 571 pounds per square inch and an 80% wood failure and after the 3 hour boil test a shear strength of 344 pounds per square inch with a wood failure of 85%.

Example 3

|  | Per cent by weight |
|---|---|
| Styrene-maleic anhydride interpolymer | 11.0 |
| Polyvinyl butyral (50% hydrolyzed) | 8.0 |
| Denatured alcohol (23A regular) | 60.0 |
| Amyl acetate | 5.0 |
| Water | 16.0 |
|  | 100.0 |

The viscosity of the partially hydrolyzed polyvinyl butyral used in this example was about 18,000 centipoises as determined in a 15% solution of the resin in a 4:1 ratio by weight mixture of 23A regular denatured alcohol and water.

The viscosity of the adhesive composition was 3400 centipoises.

The composition was prepared in accordance with the procedure given for Example 1, except that the refluxing time was 3 hours (due to the use of smaller laboratory scale equipment). Thin birch veneer plies were coated with the adhesive of this example, dried, assembled, laminated and tested by the procedure of Example 1. This adhesive gave a dry shear strength of 690 pounds per square inch with an 88% wood failure, 457 pounds per square inch after the 3 hour boil test with 100% wood failure and 547 pounds per square inch with 100% wood failure after the 10 cycle test.

This example illustrates the use of partially hydrolyzed polyvinyl butyral as one of the essential ingredients. Other partially hydrolyzed polyvinyl acetals including the reaction products of hydrolyzed (or partially hydrolyzed) polyvinyl esters with the lower alkyl aldehydes, such as formaldehyde, acetaldehyde, propionaldehyde and valeraldehyde may also be used.

Although the examples have illustrated the preparation of plywood by the well-known bag process which is more commonly used for molded plywood and for such work the present adhesives are eminently suited, the new products are also of outstanding utility for manufacturing flat plywood where conventional heated platens are used. The more recently developed method of joining wood veneer plies by inducing heat in the glue line by high frequency electric current as disclosed in the Pitman Reissue Patent 22,301, is also applicable with the compositions of the present invention.

Linear polyvinyl resin compositions containing a plurality of carboxyl and hydroxyl groups with the carboxyls in excess of the hydroxyl groups are suitable for the practice of this invention. This resin composition can be a mixture of two linear polymeric resin compositions, one containing carboxyl groups and the other containing hydroxyl groups. The carboxyl containing polymers are usually the products of polymerization or interpolymerization of alpha, beta-ethylenically unsaturated monobasic acids or anhydrides, for example, acrylic and methacrylic acids and anhydrides, or are the products of polymerization or interpolymerization of alpha, beta-ethylenically unsaturated dibasic acids or anhydrides, for example, maleic acid or anhydride, citraconic, fumaric, mesaconic acids, etc. In the case of the acid anhydrides whether polymerized per se or interpolymerized with other polymerizable compounds, the resulting polymeric anhydrides can be hydrolyzed to the free acids.

The carboxyl containing polymers can also be derived from the polymerization or interpolymerization products of monomeric alpha, beta-ethylenically unsaturated compounds which have groups capable of forming carboxyl groups on hydrolysis, for example, the nitriles, amides, and esters of the above mentioned acids, examples of which are acrylonitrile, acrylamide, methyl methacrylate, and the like. Useful carboxyl containing interpolymers are also obtained by the hydrolysis of the interpolymerization products of the above acids and anhydrides with polymerizable compounds containing a single $>C=CH_2$ group, preferably hydrocarbon, for example, the maleic anhydride interpolymers of U. S. 2,047,398, U. S. 2,118,925, and application Hanford Ser. No. 410,337, filed September 10, 1941, now Patent No. 2,378,629, which are illustrated by the hydrolyzed interpolymers of maleic anhydride and styrene, maleic anhydride and dipentene, maleic anhydride and ethylene, respectively.

The portion of the polymeric linear resin composition containing hydroxyl groups is usually a polyvinyl alcohol. These polyvinyl alcohols can generally be obtained by the hydrolysis of a polyvinyl ester, that is, an ester of polyvinyl alcohol per se, an ethylene/vinyl ester interpolymer, a vinyl halide/vinyl ester interpolymer and the like. For example, these polyvinyl alcohols can be partially or completely hydrolyzed polyvinyl acetate, partially or completely hydrolyzed ethylene/vinyl acetate interpolymers, or partially or completely hydrolyzed vinyl chloride/vinyl acetate interpolymers.

It is frequently advantageous to have both carboxyl and hydroxyl groups present in the same molecule and the linear polymeric polyvinyl resin compositions of this type can readily be prepared by interpolymerizing a polymerizable alpha, beta-ethylenically unsaturated monobasic carboxylic acid or anhydride as previously mentioned with an ester, e. g., vinyl acetate, as one of the components of the interpolymerization reaction, and the resinous products obtained after hydrolysis can be reacted with the cellulosic material to carry out this invention. It is often desirable to employ the hydrolysis product of a 3-component interpolymer of an alpha, beta-ethylenically unsaturated acid or anhydride, a vinyl ester, and a third alpha, beta-ethylenically unsaturated compound containing a single $>C=CH_2$ group, preferably a hydrocarbon copolymerizable therewith. For example, one of the preferred compositions for reacting with the cellulosic materials is the hydrolyzed interpolymer of styrene/maleic anhydride/vinyl acetate.

It is possible to hydrolyze the interploymerization product of the vinyl ester only partially so as to obtain a polymer with ester groups along with the carboxyl and the hydroxyl groups. Ester groups can also be introduced into the polymers by esterification of the carboxyl groups already present with the alcohols used as solvents. Hydrolysis of the ester and/or anhydride containing polymers can be carried out and the hydrolysis products isolated prior to reaction with cellulose, or the ester and/or anhydride containing polymers can be hydrolyzed in the solution in which the polymer is brought into intimate contact with the cellulose. Usually this solution contains an alcohol and the hydrolysis product of the anhydride is the half acid ester.

Monomers such as the ethylenically unsaturated hydrocarbons, styrene, ethylene, and indene particularly when interpolymerized with maleic anhydride are desirable constituents for the interpolymerization products because they contribute water-resistance and other valuable properties when the resin composition containing them is reacted with the cellulosic substances. All of the monomers may be combined in one polymer or they may be polymerized separately and the polymers mixed in solution. The required monomers may be polymerized in the combinations desired and then added in solution to the cellulose, or the monomers may be polymerized directly in the presence of the cellulose.

The viscosity of the polyvinyl acetate used in the new adhesives is critical in that acceptable results are not obtained if the viscosity as determined in accordance with previously described procedure is below about 400 centipoises. Acceptable results have been obtained where the viscosity of the polyvinyl acetate is about 8000 centipoises, but in general for the optimum in application properties and joint strength a viscosity of the polyvinyl acetate of between 4000 and 6000 centipoises is preferred.

Adhesive compositions employing between about 45% and 55% hydrolyzed polyvinyl acetates are preferred although in some instances fairly acceptable results have been obtained with as low as 37% or as high as 77% hydrolyzed polyvinyl acetates. Poor results were secured when the degree of hydrolysis was much below 37%.

Within the range of polyvinyl acetate viscosities found to be useful for present purposes, a total solids content for the new adhesives of about 20% is preferred for best application properties although in some instances the solids content may vary between about 5% and 30% or more or up to the solubility of the polymers. However, it is generally preferable to adjust the solids content to produce a solution with a viscosity of between about 1800 and 3600 centipoises and for best results a viscosity of about 2500 centipoises.

Suitable solvent systems include any of the lower aliphatic alcohols (containing less than 4 carbon atoms) and other low molecular weight water-miscible volatile solvents used in conjunction with water. A mixture of 23A regular denatured alcohol and water in the ratio of 4:1 provides an excellent solvent vehicle. It has also been found that a small amount of volatile solvent having an evaporation rate less than that of water and preferably less than that of butyl acetate added to the adhesive compositions provides a distinctive advantage in the application of the adhesive and is of particular importance in eliminating curling tendencies when applied to thin wood veneer. Curling of the veneer presents serious manufacturing problems, particularly in the assembly and final joining of the adhesive coated veneer. The addition of solvents such as diacetone alcohol, octyl alcohol, amyl acetate, ethylene glycol monoethyl ether, butyl propionate, ethylene glycol monobutyl ether, ethyl lactate and butyl lactate added to the extent of between about 4% and 10% (preferably about 5%) eliminates curling tendencies.

Plasticizers such as dibutyl phthalate may be included in the compositions in small amounts if desired but for most purposes, plasticization is not necessary or desirable since the adhesives are sufficiently flexible even at very low temperatures.

Catalytic modifiers may also be incorporated in the original solution. These modifiers may be esterification catalysts, e. g., acids such as maleic, oxalic, and latent acid substances such as ammonium chloride and sulfate. Maleic anhydride has been effective in setting up the styrene-maleic anhydride interpolymer, partially hydrolyzed polyvinyl acetate combination in its use for bonding plywood. Cross-linking agents for hydroxyl group-containing polymers may be also used. Examples of this type are dichlorodioxane and dimethylol urea. The ratio of carboxyl groups to hydroxyl groups in the polymer mixture may be in the range from 4 to 1, but the range between 2.5 and 1.0 is preferred and the ratio of about 1.5 to 1 is ordinarily used.

The solution is spread on each glue line surface in an amount sufficient to provide 15 to 50 pounds of solid resin per 1000 square feet of finished glue line. The amount of solids required is dependent upon the species of wood. Hard, dense wood requires less adhesive than soft porous woods. About 12 to 15 pounds have been found satisfactory for plywood made of birch veneer. The polymer solution may be allowed to dry on the veneer for 15 minutes to 1 hour or even longer before bonding into plywood. A period of 1 hour to 1 day is preferred. A better bond is obtained with less resin if most of the solvent is allowed to evaporate. This prevents the polymers from becoming too fluid when heated and penetrating excessively into the wood.

The bonding of plywood with these cellulose modifiers may be accomplished by operating within a temperature range of 100° to 180° C. with a specific pressure of 25 to 500 pounds per square inch for 1 minute upwards. The preferred ranges include a temperature from 130° to 150° C. for 10 to 25 minutes. The specific pressure is governed more by the species of wood than any other consideration. The pressure serves only to bring the veneer sheets into intimate contact. Soft woods require less pressure than hard woods such as birch which has been successfully bonded at pressures of 200 to 250 pounds per square inch.

In view of the unique properties of the new adhesive compositions, they are admirably suited for various important utilities. While they provide superior properties in flat plywood structures and in its manufacture, they are of outstanding value in the preparation of molded plywood where conventional adhesives have not been particularly successful. Such plywood structures using the improved adhesives may be used to great advantage in aircraft manufacture and in the manufacture of radio masts or other utility where stringent requirements for weather resistance, flexibility and high joint strength are encountered. Preformed objects, e. g., boats, containers, etc., are other examples of utility. The products may be employed for general adhesive purposes such as laminating fabric, paper, glass, regenerated cellulose sheeting, leather and metal. In view of the good resistance of the adhesives to oils and greases, regenerated cellulose sheeting or paper laminated with the new materials are well suited for packaging foods of fatty nature.

Numerous important advantages are afforded by the present invention. Particularly noteworthy are the high shear strengths both dry and after immersion in boiling water obtained in plywood in which the new adhesives are used as bonding means. Of primary importance also is the excellent flexibility of the compositions after conversion, a property that distinguishes from the conventional resinous adhesives. The new adhesives are not susceptible to plastic flow at normally encountered temperatures and, therefore, plywood prepared with them does not show slippage of the laminations at the glue line. The improved plywood structures do not fail in the glue line when under stress as often occurs with the ordinary adhesives since there is apparently a chemical reaction with the cellulose which thereby improves joint strength. The adhesives of the invention are tough and quite flexible even at very low temperatures. A distinctive advantage resides in the relatively slower conversion of the resin during the heating cycle which greatly facilitates the manufacture of molded plywood, a type of plywood quite difficult to manufacture with the present commercial adhesives because the conversion cycle is too rapid. The compositions are also quite resistant to petroleum hydrocarbons, a property which increases their utility in certain specialized fields. An advantage of considerable importance consists of the elimination of curling tendencies in the adhesive coated veneer, thus facilitating the handling and assembling of the plies during processing operations.

It is apparent that many widely different embodiments of this invention may be made without departing from the spirit and scope thereof, and therefore, it is not intended to be limited except as indicated in the appended claims.

We claim:

1. An adhesive composition particularly adapted for joining cellulosic surfaces, comprising a polyvinyl resin consisting of the soluble partial reaction product of a mixture of a linear polymeric polycarboxylic acid and a 37% to 77% hydrolyzed polyvinyl acetate having a viscosity of between about 400 to 8,000 centipoises in a 15% solution of the acetate in a 4:1 solution of ethyl alcohol and water, the number of carboxyl groups in the mixture being in excess of the number of hydroxyl groups but less than four times the hydroxyl groups, and a volatile solvent vehicle containing from 5% to 10% based on the final composition of a solvent for the resin having an evaporation rate less than that of butyl acetate, said composition having a viscosity of between about 1,800 and 3,600 centipoises.

2. The composition of claim 1 in which the linear polymeric polycarboxylic acid is a hydrolyzed styrene-maleic anhydride interpolymer.

3. The composition of claim 1 in which the resin is a mixed reaction product of hydrolyzed styrene-maleic anhydride interpolymer and a high molecular weight, 45–55% hydrolyzed polyvinyl acetate.

4. An adhesive composition, particularly adapted for joining cellulosic surfaces, which comprises a soluble partial reaction product of a mixture of a hydrolyzed interpolymer of styrene and maleic anhydride, a 37–77% hydrolyzed polyvinyl acetate having a viscosity of more than 400 but less than 8,000 centipoises in a 15% solution of the acetate in an 80:20 solution of ethyl alcohol and water, the said mixture having a plurality of carboxyl and alcoholic hydroxyl groups in which the number of carboxyl groups exceeds the number of hydroxyl groups but is less than about four times thereof, and a solvent vehicle containing about 5–10% based on the total composition of a solvent for the resin having an evaporation rate less than that of butyl acetate.

5. The composition of claim 4 in which the viscosity of the partially hydrolyzed polyvinyl acetate is between about 4,000 and 6,000 centipoises.

6. The composition of claim 4 in which the styrene-maleic anhydride interpolymer and the partially hydrolyzed polyvinyl acetate are present in the proportion by weight of about 1.5:1.

7. The composition of claim 4 in which the viscosity of the final composition is about 2,500 centipoises.

8. The composition of claim 4 in which the polyvinyl acetate is about 50% hydrolyzed.

9. The process of preparing plywood which comprises applying to at least one of the plies an adhesive composition containing the composition of claim 4, placing another ply in contact with the said adhesive and thereafter effecting a reaction of the adhesive with the cellulose in the wood plies and the curing of the resin by subjecting the laminated plies to an elevated temperature of about 100° C. to 180° C.

10. The process of preparing plywood which comprises applying to at least one of the plies the composition of claim 4, evaporating the volatile solvents, placing another ply in contact with the said adhesive, and thereafter curing the resin and effecting reaction between the reactants thereof and the cellulose of the wood by subjecting the laminated plies to a temperature of about 135° C. at a pressure of 40 lb. gauge for about 20 minutes.

11. A laminated article having a plurality of cellulosic plies firmly bonded by an adhesive comprising the reaction product of a hydrolyzed interpolymer of styrene and maleic anhydride and a 37–37% hydrolyzed polyvinyl acetate, the mixture thereof before reaction containing a plurality of carboxyl and alcoholic hydroxyl groups, the carboxyl groups being in excess of but less than four times the number of hydroxyl groups, and said hydrolyzed polyvinyl acetate having a viscosity characteristic of more than 400 but less than 8,000 centipoises in a 15% solution of the acetate in an 80:20 solution of alcohol and water.

12. The article of claim 11 in which the plies are wood veneer.

13. The article of claim 11 in which the adhesive contains about 58% of about equal molecular proportions of styrene and maleic anhydride before reaction, and about 42% of a 50% hydrolyzed polyvinyl acetate having a viscosity characteristic of 5,000 centipoises in a 15% solution of the acetate in a 4:1 mixture of ethyl alcohol and water.

LEE L. BLYLER.
JOHN W. CLOUGH.
CHARLES W. HAWLEY.
EARLE C. PITMAN.

REFERENCES CITED

The following references are of record in the file of this patent:

UNITED STATES PATENTS

| Number | Name | Date |
| --- | --- | --- |
| 1,784,008 | Herrmann et al. | Dec. 9, 1930 |
| 2,047,398 | Voss et al. | July 14, 1936 |
| 2,150,697 | Nevin | Mar. 14, 1939 |
| 2,193,941 | Seebach | Mar. 19, 1940 |

OTHER REFERENCES

P. 14, "Vinylite Series V Resins for Surface Coatings," publ. 1939 by Carbide & Carbon Chem. Corp.

Durrans, "Solvents," 3rd ed., pp. 38, 44, and 47; publ. 1938 by Chapman & Hall, London.